Patented Nov. 7, 1933

1,934,639

UNITED STATES PATENT OFFICE 1,934,639

ALKALINE FILLER

Harold Robert Rafton, Andover, Mass., assignor to Raffold Process Corporation, a corporation of Massachusetts No Drawing. Application July 18, 1930
Serial No. 468,986

20 Claims. (Cl. 91—68)

My invention relates to an improved alkaline filler.

The principal object of my invention is to provide an improved alkaline filler and paper filled and/or coated therewith.

An important object is to provide an improved alkaline filler from which oversize particles have been removed.

An important object is to provide an improved alkaline filler from which the oversize particles have been substantially completely removed.

A further object is the production of an improved paper filled with ultraalkaline filler.

A further object is the production of an improved paper coated with ultraalkaline filler.

Other objects and advantages will become apparent during the course of the following description.

Alkaline fillers may be produced by two general methods. They may be produced according to the first method either by the interaction of two materials in solution or by the interaction of a gas and a solution: for example, solutions of calcium chloride and sodium carbonate react to produce a precipitate of calcium carbonate (an alkaline filler) and a solution of sodium chloride; likewise, for example, a clear solution of barium hydroxide and carbon dioxide react to produce a precipitate of barium carbonate (an alkaline filler). Alkaline fillers so produced, because they are thrown down from solution, have a substantially uniform particle size, characteristically coarse or fine according to the conditions under which the reaction takes place, and according to the form which any given alkaline filler can naturally or artificially assume.

The second general method for the production of alkaline fillers is that in which, in a fluid medium, a base is reacted upon which is difficultly soluble or only partially soluble at the concentration at which the reaction takes place. Such a base may be lime or lime containing magnesia, magnesia, baryta, strontia, or the like. In such case there is always present a greater or lesser proportion of the base as a solid phase during at least part of the reaction, and of course there is normally conicidentally present a certain amount of the base in dissolved condition. The base may be present in a state of relatively fine subdivision in a liquid suspension, milk or mud, and usually this suspension, milk or mud, is an aqueous one, such for example as lime in water, previously slaked if desired. The base is reacted upon to produce the alkaline filler usually by a soluble material such as sodium carbonate, either as a solid or in solution, or by a gas such as carbon dioxide. Of course the base need not be made into a suspension prior to the reaction, but may be made so coincidentally therewith as for example when lime is added to a solution of sodium carbonate.

It has been found that the particle size and size distribution of alkaline fillers produced by the second general method are allied to the particle size and particle size distribution of the bases from which they are produced. It is obvious that as these bases are not of a completely homogeneous particle size and size distribution the alkaline fillers produced therefrom will also not be completely homogeneous as to particle size and size distribution.

Alkaline fillers produced by the first method are expensive. Alkaline fillers produced by the second method, on the other hand, in many instances may be procured very inexpensively, as they are produced in a number of processes, for example in the causticizing process, as by-products or co-products. Such processes thus constitute a very economical source of alkaline fillers produced by the second method.

Alkaline fillers made by the second method, however, although much less expensive than those made by the first method have been found to have different characteristics as evidenced by the fact that paper filled and/or coated therewith possesses certain defects. The reason for these defects was at first very obscure, but as the result of an extended research I have found that the different characteristics of the fillers made by the second method and the defects in the paper made therewith are caused by the above described non-homogeneity of the filler, and particularly by the presence of oversize particles therein.

It is to alkaline fillers of the type not originally of a substantially homogeneous particle size, such for example as alkaline fillers made by the second general method given above, that my invention is directed, and where the term "alkaline filler" is hereafter used in this description or in the claims, it is intended to refer only to alkaline fillers of this type.

While alkaline fillers (i. e. of this type) are non-homogeneous, I have nevertheless found that in any given alkaline filler the majority of particles, and usually the great majority of particles, are of approximately one size, and this particle size is responsible for imparting certain general distinguishing characteristics to any individual alkaline filler. I term these characteristic particles "ultimate" particles, and although there may be present a relatively minor amount of particles smaller than the ultimate particles, which may be termed "subultimate" particles, the subultimate particles play but a minor role in determining the general characteristics of an alkaline filler, and they may thus be grouped with the ultimate. As an example of the effect of ultimate particle size as determining the general nature of an alkaline filler, calcium carbonate in the form of "lime mud" may be cited as being characterized by a relatively coarse ultimate particle size, whereas calcium carbonate magnesium hydroxide may be cited as being characterized by a relatively fine ultimate particle size.

In addition to the ultimate particles, I have found that alkaline fillers contain two other main groups of particles. The first I term "oversize", and the second I term "intermediate". All particles larger than the ultimate fall into one or the other of these two groups.

Practically all alkaline fillers have been put through a fine mesh screen in the process of their manufacture, usually 150 mesh or even finer, for example 200 mesh in certain cases. The presence of any particles larger than will pass through the mesh originally used is therefore fortuitous. The particles in the combined "oversize and "intermediate" groups thus consist of all sizes ranging from those just passing through 150 or 200 mesh as the case may be down to the size of the ultimate particles.

As stated above I have found that in the use of alkaline fillers particularly for coating or filling paper the presence of oversize particles, i. e. particles larger than a certain limiting size, is the important cause of defects in the paper produced therewith. So far as I am aware no one has previously determined this limiting particle size. By careful experimentation I have determined that this limiting particle size is approximately .001". All particles in an alkaline filler which are greater than approximately .001", I have thus termed "oversize" particles, whereas all particles between the oversize and the ultimate I have termed "intermediate", and in this description and appended claims the terms "oversize" and "intermediate" are to be considered as having the above defined meanings.

I have found that the oversize particles are very deleterious in alkaline fillers used for coating paper or for filling paper, because in coated paper they cause lumps in the coating with subsequent dusting during the drying, reeling and calendering operations, and are a cause of unevenness of finish and non-uniformity in the printing qualities of the resulting paper. In filling paper, the oversize particles tend to settle out, especially when the stock is in dilute suspension, cause uneven distribution of the filler throughout the sheet, particularly cause unevenness of finish in the sheet and in its printing qualities, and require that the paper receive excess pressure on calendering to produce a given finish.

The intermediate particles are not detrimental in the sense that the oversize is detrimental, but the percentage of them present as well as their average size influences the general characteristics imparted to either coated or filled paper by any given alkaline filler.

The reduction of the oversize particles in alkaline fillers is thus greatly to be desired. Attempt has previously been made to reduce the particle size of alkaline fillers and/or the "grit" therein by grinding, as in pebble, ball, or rod mills, and this method if carried far enough will completely reduce and thus eliminate the oversize. But in so doing it also reduces the other particle sizes, i. e. the intermediate and the ultimate, with the result that the general characteristics of an alkaline filler are profoundly modified, which in certain cases is very undesirable. The effect of such grinding is not to render an alkaline filler completely homogeneous as to particle size, but rather to move the curve of particle size distribution toward smaller sizes, each particle size being progressively reduced. Furthermore the grinding method has the disadvantage of discoloring the alkaline filler, especially in the case of the severe treatment required to completely grind or reduce all the oversize.

Other methods such as elutriation or hydroseparation have been tried in an attempt to remove the oversize of alkaline fillers, but semicommercial trials with the most efficient apparatus at present available have proven that such methods do not remove sufficient oversize so that a suitable quality of alkaline filler may be produced thereby. Moreover the apparatus required in such methods is very large and expensive, requires excessive floor space, and involves reconcentration of solids from the necessarily dilute suspensions in which hydroseparation is required to be effected. Air flotation methods have also been tried but there have likewise proved incapable of producing suitable quality of alkaline filler, and furthermore these methods have the very great disadvantage of requiring the drying of the alkaline filler before they can be employed. This is costly and in certain cases results in agglomeration of particles on drying which agglomerates do not readily disperse on subsequent wetting. Also such methods do not function properly where oversize particles of different specific gravity exist in the alkaline filler.

In my copending application Serial No. 468,985, filed July 18, 1930, I have described alkaline filler, the oversize particles of which have been reduced or substantially eliminated by either of two special methods, which results in an alkaline filler which I have termed "homogenized alkaline filler" having a substantially decreased or completely eliminated percentage of oversize, an increased percentage of intermediate, and a substantially unaffected percentage of ultimate, except in the case where the original alkaline filler treated had a very coarse ultimate particle size. Whereas homogenized alkaline filler is satisfactory to use and produces an improved paper filled with alkaline filler and an improved paper coated with alkaline filler, I have found that in some instances the homogenizing treatment modifies the quality of the alkaline filler so homogenized so that whereas it is improved, the improved paper produced therewith does not possess certain characteristics which are sometimes desirable. This seems to be due in considerable measure to the fact that by the homogenizing treatment the number of particles of intermediate sizes are increased. It is also due to some extent to the fact that part of the oversize may consist of objectionable off-color particles which are comminuted and thus retained in the filler.

As stated previously, while the intermediate particles are not detrimental in the sense that the oversize particles are detrimental, still they do influence markedly in certain cases the character of the paper filled and/or coated with alkaline filler containing an increased percentage of intermediate.

For example whereas paper coated with alkaline filler in which the proportion of intermediate has been increased by homogenizing the filler will be smooth and of good finish, I have found nevertheless that it will not take as high a finish, as will be the case of paper coated with alkaline filler otherwise similar except containing a lesser degree of intermediate particles. Likewise the ink absorption of the former paper is somewhat greater than that of paper coated with alkaline filler containing a lesser number of intermediate particles and the printing results on the former paper are not so sharp nor so clean cut as on the latter paper.

Likewise I have found that paper filled with homogenized alkaline filler which necessarily contains a larger percentage of intermediate particles is not of such good quality as paper filled with alkaline filler otherwise similar except containing a lesser percentage of intermediate particles, chiefly owing to the fact that the larger percentage of intermediate particles do not permit such an intimate incorporation of the filler and fibre in the sheet as is the case when a smaller percentage of intermediate particles are present, and this results in a sheet which does not take the ink quite so well, and which does not finish quite so highly with the same amount of power, as does a paper made with alkaline filler containing a lesser percentage of intermediate particles.

As result of a prolonged research I have devised a novel method whereby the oversize particles of alkaline filler may be substantially completely removed without thereby changing the proportion of intermediate to ultimate particles which existed in the original untreated alkaline filler, and without thereby changing the particle sizes either of the intermediate or of the ultimate such as would result in a grinding operation (e. g. in a pebble mill) as explained above.

The method I employ is to pass the alkaline filler, preferably in liquid suspension, through a plated fine mesh wire cloth such as is described in my copending application Serial No. 420,794, filed January 14, 1930. The proper concentration of the suspension may readily be determined for each individual case; in general the finer the holes, the more dilute the suspension desirable. As explained in my copending application, commercial screening practice has heretofore been confined to wire cloth of 150 mesh or possibly 200 mesh in some cases. Only rarely have finer meshes been used owing both to frailty of the wire cloth in the finer meshes as well as to the cost. However using my new plated fine mesh wire cloth it is now feasible to pass materials commercially through cloth with openings corresponding to meshes finer than any hitherto commercially used and even finer than any hitherto made. Thus I may pass my alkaline filler through a plated fine mesh cloth with openings approximately .001" or somewhat less. This would correspond approximately to a wire cloth of 575 mesh, which is finer than any wire cloth which to my knowledge has hitherto been made.

I may use any convenient screening machine equipped with my plated wire cloth for the purpose, but I have found that the gyratory riddle screen pan disclosed in my copending application Serial No. 359,943, filed May 2, 1929, is particularly suitable.

I may pass the alkaline filler after it has been produced through the plated fine mesh wire cloth, or I may conduct the process at various points in the manufacture of the alkaline filler, in any case at the concentration experimentally determined for that particular condition to be most suitable, in general more dilute suspensions screening more readily than more concentrated ones. For example I may pass the base, from which the alkaline filler is to be made, in liquid suspension prior to the actual formation of the alkaline filler, through the wire cloth, or I may pass the slurry through it after the reaction has taken place, or if the reaction takes place in steps, I may conduct the operation between such steps. The point of passage of either the base or the filler produced therefrom through the wire cloth is carried out at the point which is determined as most feasible in each individual case.

The characteristics of alkaline filler so possessed are novel and well defined, namely, the particle size of the ultimate and intermediate particles have been unchanged, and the proportion of ultimate to intermediate has remained also substantially unchanged, except in the case where plated wire cloth with openings of less than .001" has been employed, in which case a certain portion of the larger intermediate particles will have been removed. The main difference between the processed alkaline filler and the original alkaline filler is that the range of particle size has been restricted through the substantial elimination of the oversize. There is no increase in percentage of intermediate as in the case with a homogenized alkaline filler. Likewise there is no reduction in the ultimate particle size and thus the production of excessively fine or colloidal particles is avoided which is an important disadvantage in certain cases in the quality of alkaline filler produced where grinding procedures are used. Moreover by my treatment for removing oversize particles the color (whiteness) of alkaline filler may be improved by the removal of off-color oversize particles, a point of very great importance as the economic value of an alkaline filler is greatly influenced by its color. In contradistinction, the color of alkaline filler is substantially unimproved by homogenizing, and very appreciably reduced by grinding. It will thus be seen that my improved alkaline filler has qualities different from any heretofore produced and is characterized by the fact that the particle size distribution has been limited by the substantial elimination of the oversize, without substantially any change taking place in the ratios of the intermediate and ultimate or any change in the actual particle sizes thereof, except in the case as noted above where part or the larger intermediate particles may be removed. Its color may also have been improved.

The plated fine mesh wire cloths I use, extending the practical range of separation of fine particles as they do, I have termed "ultrawire cloths". My novel alkaline filler processed therethrough as herein described and/or possessing the characteristics herein described I have termed "ultraalkaline filler".

I have found that paper filled with ultraalkaline filler possesses superior printing qualities, takes a better finish, requires less pressure on the calenders, and may be of a better color than paper filled either with ordinary alkaline filler, or with homogenized alkaline filler. Such improved paper may be sized with suitable sizing, such as rosin size, paraffin emulsions or the like, as may be used in sizing carbonate filled paper, as shown for example in my prior Patents Nos.

1,803,642, 1,803,645, 1,803,650, 1,803,651, and 1,803,652, all issued May 5, 1931, or may be unsized as desired. The ultraalkaline filler therein may be distributed substantially uniformly throughout.

Likewise I have found that paper coated with ultraalkaline filler (mixed with a suitable adhesive of course such as the customary adhesives ordinarily employed for the purpose, for example casein, as disclosed (among other places) by Belle in his article on page 445 of the January 1, 1925, issue of "Paper", and with or without other mineral pigments as desired) is more uniform in finish, in certain instances can be made with less adhesive, thereby having the double advantage of more economical production and higher surface gloss, prints more evenly, and may have a better color than paper coated either with ordinary alkaline filler or with homogenized alkaline filler.

As my novel alkaline filler, i. e. ultraalkaline filler, is relatively inexpensive to produce, it is apparent that it will result in the production of improved quality filled and coated papers made from inexpensive alkaline fillers, and will thus result in a marked increase in the use of alkaline filler with resultant economy in production in the manufacture of filled and coated papers.

It will be apparent that it is not possible to produce a fine mesh wire cloth as a base cloth for plating with all the openings absolutely uniform in size. For this reason if it be desired to produce an alkaline filler substantially free from oversize, it will be apparent that the average cloth opening must necessarily be somewhat less than approximately .001", in order that the maximum opening may not be greater than approximately .001". As ultrawire cloths decrease markedly in capacity as their size of opening decreases, it is sometimes desirable from the standpoint of economy, in order to increase the capacity of the screening apparatus, to use ultrawire cloths with openings of such size that they do not remove the oversize completely, for example ultrawire cloths with openings averaging approximately .001", or in certain cases slightly larger.

Thus although it is theoretically and practically desirable to remove all the oversize, nevertheless I have found that the reduction of oversize from that amount normally occurring (which in various cases ranges approximately from several percent up) to 1% by weight or less greatly improves the quality of an alkaline filler. Although such alkaline filler of course is not of such good quality as alkaline filler from which the oversize has been completely removed, nevertheless I have found that alkaline filler containing not more than 1% oversize (the larger oversize of course being substantially removed and the oversize remaining thus representing only the smaller oversize) is of a quality greatly superior to that of alkaline filler which contains the normal percentage of oversize, and produces substantially improved filled and coated paper which in certain cases where cost is all important meets the requirements satisfactorily; and therefore such improved alkaline filler is meant to be included in my term "ultraalkaline filler."

By the term "alkaline filler" I mean substantially water insoluble filler produced from a base of an alkaline earth metal or metals, (which expression is herein intended to include magnesium), difficultly soluble or only partially soluble at the concentration at which the reaction takes place, and which base is present in a greater or lesser proportion as a solid phase during at least part of the reaction necessary to produce the filler. Such filler when agitated in contact with freshly boiled distilled water, say for an hour, will impart a pH value to such water greater than 7.0, i. e. a pH value which will be on the alkaline side of the neutral point. Among fillers included in this group may be mentioned lime mud from the causticizing process (calcium carbonate); calcium carbonate magnesium basic carbonate employed in the paper disclosed in my U. S. Patent No. 1,595,416 issued August 10, 1926; calcium carbonate magnesium hydroxide disclosed in my U. S. Patent No. 1,415,391 issued May 9, 1922; and other substantially water insoluble normal or basic carbonates of alkaline earth metals, or compounds, double salts, or physically associated mixtures of these with one or more other acid soluble materials of a substantially water insoluble nature.

I also mean to include such compounds which may not necessarily be produced from a difficultly or partially soluble base as above described, but which occur naturally in massive form and/or which require comminution prior to use, such for instance as chalk, limestone, etc. Such materials when comminuted commercially produce non-homogeneous alkaline fillers which although not generally of such good quality as those produced by the second general method mentioned herein, nevertheless when passed through ultrawire cloth yield alkaline fillers with characteristics analogous to those of the ultraalkaline fillers derived from the alkaline fillers defined in the preceding paragraph.

I mean, however, specifically to exclude the coating pigment "satin white" from the scope of the expression "alkaline filler" as defined herein, as satin white in not substantially water insoluble. I disclose and claim satin white passed through ultrawire cloth and paper coated therewith in my copending application Serial No. 468,988, filed July 18, 1930.

When I use the word "paper" herein, I use it in the broad sense to include products of manufacture of all types and of all weights and thicknesses, which contain as an essential constituent a considerable amount of prepared fibre and which are capable of being produced on a Fourdrinier, cylinder, or other forming, felting, shaping or molding machine.

While I have described in detail the preferred embodiment of my invention, it is to be understood that my invention may be varied considerably within the limitation required by the disclosures of the prior art without departing from the spirit of the invention or the scope of the subjoined claims.

I claim:

1. The method of producing improved alkaline filler from alkaline filler having oversize, intermediate, and ultimate particles, which comprises reducing the quantity of the particles exceeding .001" in size to an amount not exceeding approximately one per cent. by weight of the total filler, while maintaining the ultimate and intermediate particles in substantially the same size and in substantially the same proportion one to the other as the ultimate and intermediate particles in the alkaline filler employed in producing said improved alkaline filler.

2. The method of producing improved alkaline filler from alkaline filler having oversize, intermediate, and ultimate particles, which comprises substantially eliminating particles exceeding .001″ in size, while maintaining the ultimate and intermediate particles in substantially the same size and in substantially the same proportion one to the other as the ultimate and intermediate particles in the alkaline filler employed in producing said improved alkaline filler.

3. The method of producing improved alkaline filler from alkaline filler having oversize, intermediate, and ultimate particles, which comprises substantially eliminating particles exceeding .001″ in size, while maintaining the ultimate and intermediate particles in substantially the same size as the ultimate and intermediate particles in the alkaline filler employed in producing said improved alkaline filler, and maintaining a proportion of intermediate to ultimate particles no greater than substantially the proportion of the intermediate to ultimate particles in said alkaline filler.

4. The method of producing filled paper comprising fibrous material and improved alkaline filler produced from alkaline filler having oversize, intermediate, and ultimate particles, which comprises reducing the quantity of the particles exceeding .001″ in size to an amount not exceeding approximately one per cent. by weight of the total filler, while maintaining the ultimate and intermediate particles in substantially the same size and in substantially the same proportion one to the other as the ultimate and intermediate particles in the alkaline filler employed in producing said improved alkaline filler, and adding said improved filler to said fibrous material.

5. The method of producing filled paper comprising fibrous material and improved alkaline filler produced from alkaline filler having oversize, intermediate, and ultimate particles, which comprises substantially eliminating particles exceeding .001″ in size, while maintaining the ultimate and intermediate particles in substantially the same size and in substantially the same proportion one to the other as the ultimate and intermediate particles in the alkaline filler employed in producing said improved alkaline filler, and adding said improved filler to said fibrous material.

6. The method of producing filled paper comprising fibrous material and improved alkaline filler produced from alkaline filler having oversize, intermediate, and ultimate particles, which comprises substantially eliminating particles exceeding .001″ in size, while maintaining the ultimate and intermediate particles in substantially the same size as the ultimate and intermediate particles in the alkaline filler employed in producing said improved alkaline filler, and maintaining a proportion of intermediate to ultimate particles no greater than substantially the proportion of the intermediate to ultimate particles in said alkaline filler, and adding said improved filler to said fibrous material.

7. The method of producing coated paper comprising fibrous body stock and a coating comprising adhesive and improved alkaline filler produced from alkaline filler having oversize, intermediate, and ultimate particles, which comprises reducing the quantity of the particles exceeding .001″ in size to an amount not exceeding approximately one per cent. by weight of the total filler, while maintaining the ultimate and intermediate particles in substantially the same size and in substantially the same proportion one to the other as the ultimate and intermediate particles in the alkaline filler employed in producing said improved alkaline filler, and applying said improved filler and said adhesive to said fibrous body stock.

8. The method of producing coated paper comprising fibrous body stock and a coating comprising adhesive and improved alkaline filler produced from alkaline filler having oversize, intermediate, and ultimate particles, which comprises substantially eliminating particles exceeding .001″ in size, while maintaining the ultimate and intermediate particles in substantially the same size and in substantially the same proportion one to the other as the ultimate and intermediate particles in the alkaline filler employed in producing said improved alkaline filler, and applying said improved filler and said adhesive to said fibrous body stock.

9. The method of producing coated paper comprising fibrous body stock and a coating comprising adhesive and improved alkaline filler produced from alkaline filler having oversize, intermediate, and ultimate particles, which comprises substantially eliminating particles exceeding .001″ in size, while maintaining the ultimate and intermediate particles in substantially the same size as the ultimate and intermediate particles in the alkaline filler employed in producing said improved alkaline filler, and maintaining a proportion of intermediate to ultimate particles no greater than substantially the proportion of the intermediate to ultimate particles in said alkaline filler, and applying said improved filler and said adhesive to said fibrous body stock.

10. The method of producing alkaline filler of improved color from alkaline filler containing off-color oversize particles and having intermediate and ultimate particles, which comprises substantially eliminating off-color particles exceeding .001″ in size, and maintaining the ultimate and intermediate particles of substantially the same size as the ultimate and intermediate particles in the alkaline filler employed in producing said alkaline filler of improved color, while maintaining a proportion of intermediate to ultimate particles no greater than substantially the proportion of the intermediate to ultimate particles in said employed alkaline filler.

11. The method of producing improved alkaline filler comprising calcium carbonate from alkaline filler having oversize, intermediate and ultimate particles, which comprises reducing the quantity of the particles exceeding .001″ in size to an amount not exceeding approximately one per cent by weight of the total filler while maintaining the ultimate and intermediate particles in substantially the same size as the ultimate and intermediate particles in the alkaline filler employed in producing said improved alkaline filler, and maintaining a proportion of intermediate to ultimate particles no greater than substantially the proportion of the intermediate to ultimate particles in said alkaline filler.

12. The method of producing improved alkaline filler, which comprises causticizing sludge comprising calcium carbonate, from alkaline filler having oversize, intermediate, and ultimate particles, which comprises reducing the quantity of the particles exceeding .001″ in size to an amount not exceeding approximately one per cent by weight of the total filler, while maintaining the ultimate and intermediate particles in substantially the same size as the ultimate and intermediate particles in the alkaline filler employed in producing said improved alkaline filler, and maintaining a proportion of intermediate to ultimate particles no greater than substantially the proportion of the intermediate to ultimate particles in said alkaline filler.

13. The method of producing improved alkaline filler which comprises calcium carbonate and magnesium compound from alkaline filler having oversize, intermediate, and ultimate particles, which comprises reducing the quantity of the particles exceeding .001" in size to an amount not exceeding approximately one per cent by weight of the total filler, while maintaining the ultimate and intermediate particles in substantially the same size as the ultimate and intermediate particles in the alkaline filler employed in producing said improved alkaline filler, and maintaining a proportion of intermediate to ultimate particles no greater than substantially the proportion of the intermediate to ultimate particles in said alkaline filler.

14. The method of producing filled paper which comprises fibrous material and improved alkaline filler comprising calcium carbonate and produced from alkaline filler having oversize, intermediate, and ultimate particles, which comprises reducing the quantity of the particles exceeding .001" in size to an amount not exceeding approximately one per cent by weight of the total filler, while maintaining the ultimate and intermediate particles in substantially the same size as the ultimate and intermediate particles in the alkaline filler employed in producing said improved alkaline filler, and maintaining a proportion of intermediate to ultimate particles no greater than substantially the proportion of the intermediate to ultimate particles in said alkaline filler, and adding said improved filler to said fibrous material.

15. The method of producing filled paper which comprises fibrous material and improved alkaline filler, which comprises causticizing sludge comprising calcium carbonate, produced from alkaline filler having oversize, intermediate and ultimate particles, which comprises reducing the quantity of the particles exceeding .001" in size to an amount not exceeding approximately one per cent by weight of the total filler, while maintaining the ultimate and intermediate particles in substantially the same size as the ultimate and intermediate particles in the alkaline filler employed in producing said improved alkaline filler, and maintaining a proportion of intermediate to ultimate particles no greater than substantially the proportion of the intermediate to ultimate particles in said alkaline filler, and adding said improved filler to said fibrous material.

16. The method of producing filled paper which comprises fibrous material and improved alkaline filler comprising calcium carbonate and magnesium compound and produced from alkaline filler having oversize, intermediate, and ultimate particles, which comprises reducing the quantity of the particles exceeding .001" in size to an amount not exceeding approximately one per cent by weight of the total filler, while maintaining the ultimate and intermediate particles in substantially the same size as the ultimate and intermediate particles in the alkaline filler employed in producing said improved alkaline filler, and maintaining a proportion of intermediate to ultimate particles no greater than substantially the proportion of the intermediate to ultimate particles in said alkaline filler, and adding said improved filler to said fibrous material.

17. The method of producing coated paper which comprises fibrous body stock and a coating which comprises adhesive and improved alkaline filler comprising calcium carbonate produced from alkaline filler having oversize, intermediate, and ultimate particles, which comprises reducing the quantity of the particles exceeding .001" in size to an amount not exceeding approximately one per cent by weight of the total filler, while maintaining the ultimate and intermediate particles in substantially the same size as the ultimate and intermediate particles in the alkaline filler employed in producing said improved alkaline filler, and maintaining a proportion of intermediate to ultimate particles no greater than substantially the proportion of the intermediate to ultimate particles in said alkaline filler, and applying said improved filler and said adhesive to said fibrous body stock.

18. The method of producing coated paper which comprises fibrous body stock and a coating which comprises adhesive and improved alkaline filler, comprising causticizing sludge comprising calcium carbonate, produced from alkaline filler having oversize, intermediate, and ultimate particles, which comprises reducing the quantity of the particles exceeding .001" in size to an amount not exceeding approximately one per cent by weight of the total filler, while maintaining the ultimate and intermediate particles in substantially the same size as the ultimate and intermediate particles in the alkaline filler employed in producing said improved alkaline filler, and maintaining a proportion of intermediate to ultimate particles no greater than substantially the proportion of the intermediate to ultimate particles in said alkaline filler, and applying said improved filler and said adhesive to said fibrous body stock.

19. The method of producing coated paper which comprises fibrous body stock and a coating which comprises adhesive and improved alkaline filler comprising calcium carbonate and magnesium compound and produced from alkaline filler having oversize, intermediate, and ultimate particles, which comprises reducing the quantity of the particles exceeding .001" in size to an amount not exceeding approximately one per cent by weight of the total filler, while maintaining the ultimate and intermediate particles in substantially the same size as the ultimate and intermediate particles in the alkaline filler employed in producing said improved alkaline filler, and maintaining a proportion of intermediate to ultimate particles no greater than substantially the proportion of the intermediate to ultimate particles in said alkaline filler, and applying said improved filler and said adhesive to said fibrous body stock.

20. Improved alkaline filler produced from alkaline filler having oversize, intermediate, and ultimate particles, characterized by the fact that it does not contain in excess of one percent. by weight of the total filler, of particles exceeding .001" in size, that the ultimate and intermediate particles are of substantially the same size as the ultimate and intermediate particles in the alkaline filler employed in producing said improved alkaline filler, and that the proportion of intermediate to ultimate particles is no greater than substantially the proportion of the intermediate to ultimate particles in said employed filler.

HAROLD ROBERT RAFTON.